Patented May 28, 1940

2,202,678

UNITED STATES PATENT OFFICE 2,202,678

LOW VISCOSITY STARCH ADHESIVE AND METHOD OF PREPARING THE SAME

Kyle Ward, Jr., Washington, D. C., dedicated to the free use of the People in the territory of the United States No Drawing. Application June 13, 1938,
Serial No. 213,444

6 Claims. (Cl. 134—23.4)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

I hereby dedicate the invention herein described to the free use of the People in the territory of the United States.

My invention relates to the preparation of adhesives from starches or starchy vegetable matter, and to the adhesives so obtained. It relates particularly to adhesives containing organic "onium" bases, and to their preparation.

The preparation of adhesives from starch by conversion with inorganic alkalies is not new and a variety of methods for obtaining this result is known. The use of organic bases, such as amines, in these adhesives has been attempted, but they do not possess sufficient conversion action to be used in place of inorganic alkalies.

With certain types of starch or starchy vegetable matter, the use of inorganic alkalies produces adhesives which form plastic jellies, rather than viscous glues, and which are unsuitable for application by methods in common use. The presence of cellulosic fiber in many types of vegetable matter, with a high starch content, has a similar undesirable result, due to the presence of the swollen fiber in the finished product. In some cases, these defects may be overcome by sufficient dilution, but this reduces the adhesive power by reducing the weight of total solids per given weight of adhesive, increases the cost of handling and, in particular, increases the drying time to such an extent that the use of the adhesive becomes impracticable.

The object of my invention comprises a process for making adhesives from starches and from starchy vegetable matter in such a manner that the non-starchy constituents do not interfere with the satisfactory application and performance of the adhesives produced.

A further object is the production of adhesives of desirable consistency from starches or starchy vegetable matter which yield unsatisfactory jellies with sodium hydroxide or other inorganic bases.

I have found that satisfactory adhesives can be produced from starches or starchy vegetable matter if the starch or starchy material be converted by means of an organic onium base, instead of an inorganic hydroxide. The base used may be of various types—ammonium, sulfonium, phosphorium, etc., and my invention is not limited to the types hereinafter described, or to any of them separately. It is particularly applicable to sweet potato starch, but is not intended to be limited thereto. The conversion may be brought about by the use of a single onium hydroxide, or by a mixture of several, or by a combination of onium bases and inorganic bases such as sodium or potassium hydroxide. Other converting agents, fillers, or diluents may be present. The conversion may be carried out either at room temperature or at some other suitable temperature, as, for example, 60° or 80° C., and may or may not be followed by partial or complete neutralization or acidification. By suitable modifications, dry, cold-water starches may be produced which form glues on the addition of water.

The adhesives produced by means of onium bases are of a stringy nature and of lower viscosity than those produced by means of inorganic alkalies. If quaternary ammonium bases of sufficiently high molecular weight are used, as trimethylbenzyl ammonium hydroxide, or dimethyldibenzyl ammonium hydroxide, fibers of cellulosic nature may be dissolved, and the necessity of preliminary removal of such fibers, obviated.

The starch or starchy vegetable matter may be from several species which contain suitable amounts of starch. It may be derived from various parts of the plant, such as roots, tubers, bulbs, stock, leaves, fruit, nut, pith, or others. My invention is not intended to be limited to any species or any functional type of starch or starchy material.

Certain preferred methods of producing these adhesives are given in the following examples. These examples are given by way of illustration only, and they must not be considered as limiting my invention.

*Example 1*

8 g. of a sweet potato flour prepared by the Hopkins method (Science 87; 71 (1938)) is suspended in 15 cc. water and heated to 80° C. with stirring. 9 cc. of a 40% aqueous solution of trimethylbenzylammonium hydroxide are then stirred into the paste. The resulting adhesive is a clear brown glue in which the cellulosic impurities of the original flour are in a dissolved form.

Example 2

8 g. sweet potato starch are stirred into 22 cc. of a 10% aqueous solution of tetramethylammonium hydroxide at room temperature. The resulting viscous glue is satisfactory for adhesives and is not "short" as is the corresponding sodium hydroxide glue.

Example 3

8 g. corn starch are suspended in 16 cc. water. 6 cc. of a 40% aqueous solution of trimethylbenzylammonium hydroxide is then stirred in to form a transparent glue of a workable consistency.

Example 4

8 g. sweet potato starch suspended in 16 cc. water are treated with 0.5 cc. 40% NaOH and 6 cc. 40% trimethylbenzylammonium hydroxide, both aqueous. This produces a limpid mucilaginous glue.

One advantage of my invention over the prior art is the preparation of adhesives from starchy vegetable matter, by the use of a converting agent, which dissolves fibers of a cellulosic nature to produce a more homogeneous product. Another advantage is the preparation of adhesives with low water-starch ratio and low viscosity from starches not hitherto suitable for this purpose. Another advantage is the use of such materials in adhesive manufacture without the necessity of preliminary treatment.

It will be readily seen that different conditions will be necessary for the preparation of different types of adhesive, and it is not intended that this invention be limited to the foregoing examples. It is also evident that the amounts used may vary between wide limits, and that one or the other treatment may be most suitable for this or that type of adhesive. My invention, however, is intended to be limited only as indicated in the appended claims.

The phrase "starchy vegetable matter" in the claims is understood to include pure starch of any kind.

Having thus described my invention what I claim for Letters Patent is:

1. The method of preparing an adhesive, which comprises mixing starchy vegetable matter with water, thence subjecting the mixture to the action of an aqueous solution of an organic onium hydroxide, thereby producing an adhesive that is relatively low in viscosity.

2. The method of preparing an adhesive, which comprises mixing starchy vegetable matter with water, thence subjecting the mixture to the action of an aqueous solution containing chiefly sodium hydroxide and an organic onium hydroxide, thereby producing an adhesive that is relatively low in viscosity.

3. The method of preparing an adhesive, which comprises mixing starchy vegetable matter with water, thence subjecting the mixture to the action on an aqueous solution containing chiefly sodium hydroxide and trimethylbenzylammonium hydroxide, thereby producing an adhesive that is relatively low in viscosity.

4. The method of preparing an adhesive, which comprises mixing starchy vegetable matter with water, thence subjecting the mixture to the action of an aqueous solution containing chiefly trimethylbenzylammonium hydroxide, thereby producing an adhesive that is relatively low in viscosity.

5. An adhesive possessing a relatively low viscosity, consisting essentially of starchy vegetable matter and an aqueous solution of an organic onium hydroxide.

6. An adhesive possessing a relatively low viscosity, consisting essentially of starchy vegetable matter and an aqueous solution of sodium hydroxide with an organic onium hydroxide.

KYLE WARD, Jr.